No. 698,004. Patented Apr. 22, 1902.
T. J. GAYNOR.
SEED PLANTER.
(Application filed July 24, 1901.)
(No Model.) 2 Sheets—Sheet 1.
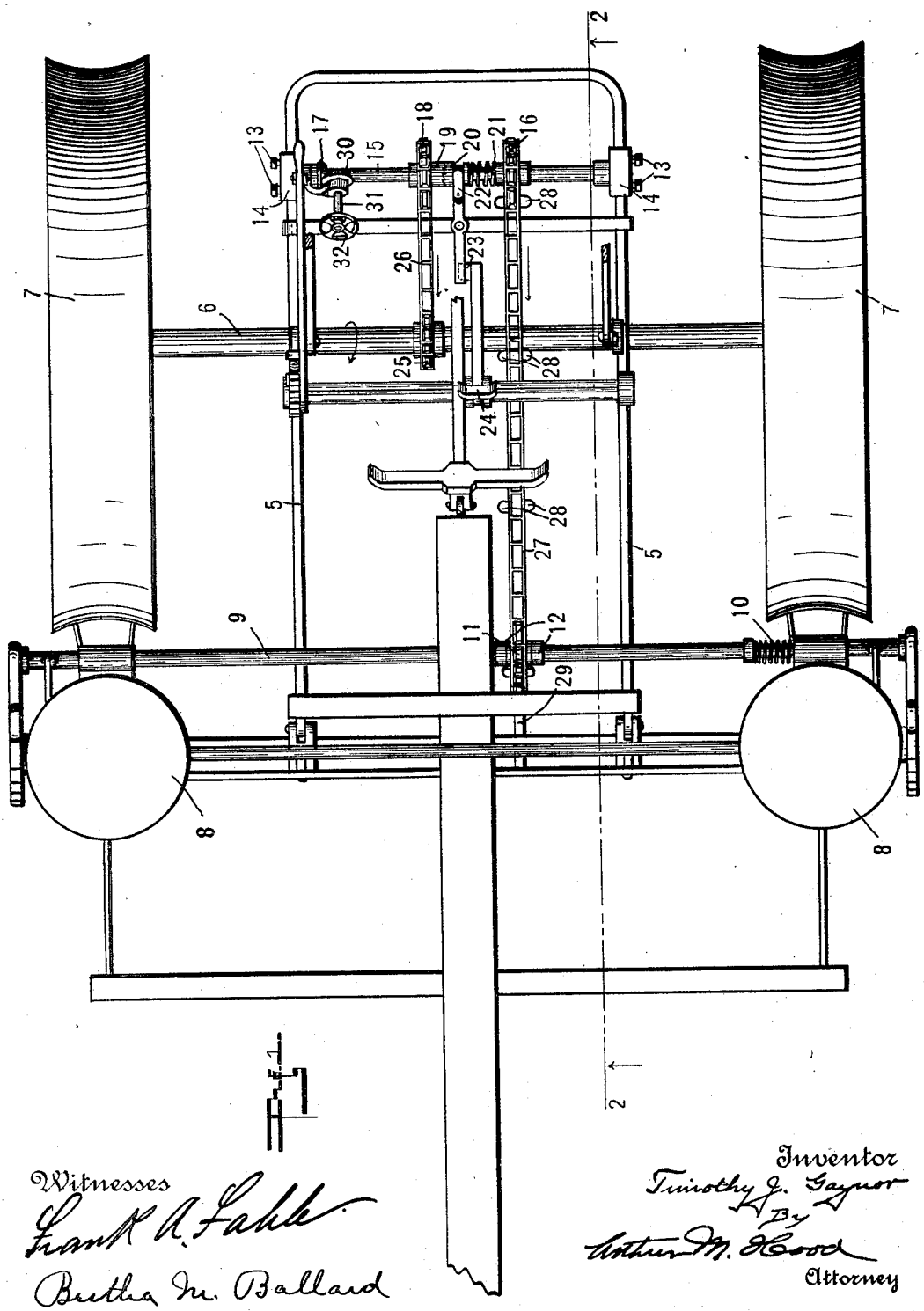

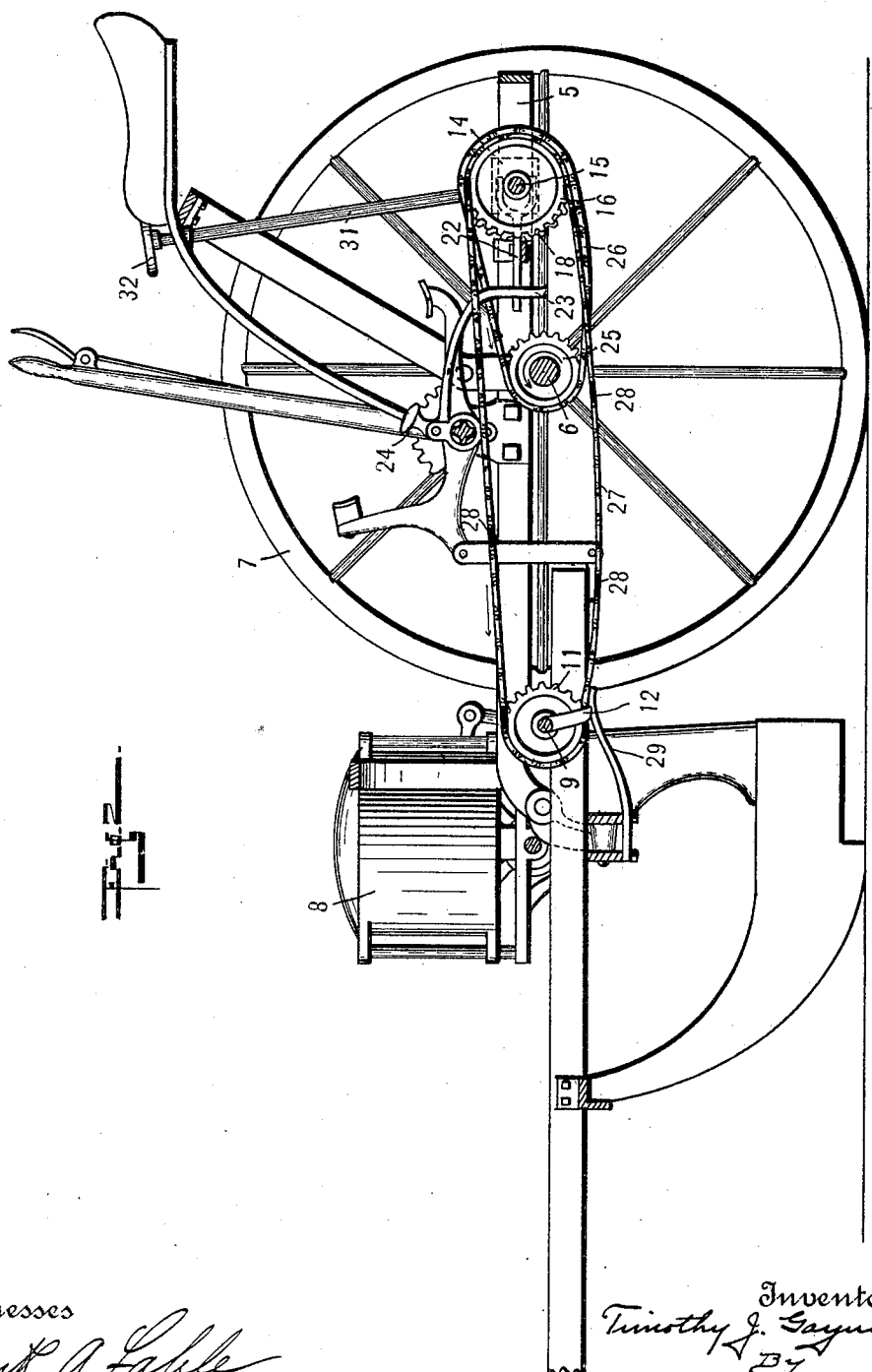

UNITED STATES PATENT OFFICE.

TIMOTHY J. GAYNOR, OF INDIANAPOLIS, INDIANA, ASSIGNOR OF ONE-HALF TO THOMAS F. GAYNOR AND WM. L. LIGHTFORD, OF INDIANAPOLIS, INDIANA.

SEED-PLANTER.

SPECIFICATION forming part of Letters Patent No. 698,004, dated April 22, 1902.

Application filed July 24, 1901. Serial No. 69,467. (No model.)

*To all whom it may concern:*

Be it known that I, TIMOTHY J. GAYNOR, a citizen of the United States, residing at Indianapolis, in the county of Marion and State of Indiana, have invented a new and useful Seed-Planter, of which the following is a specification.

My invention relates to an improvement in means for operating the dropping mechanism of a seed planter or drill.

The object of my invention is to produce a seed-planter capable of dropping the seed at regular predetermined distances without the use of a check-wire and of such character that inequalities in the movement of the machine in different rows may be easily and quickly compensated.

The accompanying drawings illustrate my invention.

Figure 1 is a plan of a machine embodying my invention. Fig. 2 is a vertical section on line 2 2 of Fig. 1.

In the drawings, 5 5 indicate parallel arms of a main frame, in which is journaled the axle 6, carried by supporting-wheels 7 7, one of which is secured to the axle 6, so as to rotate the same.

Mounted upon the main frame or connected thereto in any desired manner are the seed-boxes 8 8, each of which is provided with any desired form of dropping mechanism (not shown) operating by a rock-shaft 9, normally held at one extreme of its oscillation by a spring 10 in the manner usual in check-row planters. Revolubly mounted upon shaft 9 is a sprocket-wheel 11, and secured to shaft 9, one upon each side of the sprocket 11, are two arms or fingers 12, the purpose of which will appear.

Mounted upon each of arms 5 and longitudinally adjustable thereon by any suitable means, such as set-screws 13, is a box 14. Journaled in the two boxes is a counter-shaft 15, to which is secured a sprocket-wheel 16 and a bevel-pinion 17. Rotatably mounted upon counter-shaft 15 is a sprocket-wheel 18, provided with a clutch member 19. Cooperating with clutch member 19 is a clutch-collar 20, splined upon shaft 15 and normally held in engagement with the part 19 by means of a spring 21. Collar 20 is engaged by a lever 22, which in turn is engaged by a cam 23, carried by a foot-lever 24. Secured to the axle or shaft 6 is a sprocket-wheel 25, and passing over said sprocket-wheel and the sprocket-wheel 18 is a chain 26. Passing over sprocket-wheels 16 and 11 is a check-chain 27, provided at intervals with links having oppositely-extending ears 28, which are adapted to be brought into engagement with the fingers 12 of the shaft 9, being held in engagement with said fingers through a certain required distance by means of a guide 29. Meshing with the bevel-pinion 17 is a pinion 30, secured to the lower end of a shaft 31, provided with an operating-wheel 32, which is brought up toward the seat in position where it may be readily grasped by the operator.

Chain 27 is preferably of the separable-link type in order that any desired number of links carrying the ears 28 may be placed in the belt, by means of which the distance traversed by the machine between drops may be accurately controlled. The adjustability of the counter-shaft toward and from the rock-shaft materially aids in desired arrangements of the ear-carrying links of the belt 27.

In operation the forward movement of the vehicle causes a rotation of shaft 6 in the direction indicated by the arrow and through sprocket 25, chain 26, and sprocket 18 rotates counter-shaft 15 in the same direction, the rotation of said shaft through clutch-collar 20 causing a rotation of sprocket 16 and a movement of belt 27, so as to intermittently bring the ears 28 into engagement with the fingers 12, so as to intermittently operate the dropping mechanism. If for any reason the drop takes place too soon, the operator by moving foot-lever 24 may throw clutch-collar 20 out of engagement with the sprocket 18, and thus retard chain 27, so as to delay the operation of the next drop. If, on the other hand, the drop is too late, the operator by grasping wheel 32 may advance shaft 15, and consequently advance chain 27 ahead of or faster than the movement which would be imparted by the shaft 6. By means of the wheel 32 the belt 27 may be advanced and the dropping mechanism operated while the machine is standing.

I claim as my invention—

1. In a seed-planter, the combination with a dropping mechanism, of a belt provided with means for intermittently operating said dropping mechanism, a wheel rolling upon the ground, driving means between said wheel and belt, means for disconnecting said belt from the driving-wheel, and means for advancing said belt independent of its driving-wheel without disconnecting said belt from the driving-wheel.

2. In a seed-planter, the combination with the main frame, supporting-wheels, and the axle thereof, of a counter-shaft, separable driving connections between said counter-shaft and axle, means for separating said connections, a rock-shaft forming part of a dropping mechanism, a belt driven by the counter-shaft, means carried by said belt for intermittently engaging and operating the rock-shaft, and means for rotating the counter-shaft independent of the axle without disconnecting the counter-shaft from the axle.

3. In a seed-planter, the combination with the main frame, supporting-wheels and the axle thereof, of a counter-shaft, separable driving connections between said counter-shaft and axle, means for separating said connections, a rock-shaft forming part of a dropping mechanism, means for adjusting the counter-shaft toward and from the rock-shaft, a belt driven by the counter-shaft, means carried by said belt for intermittently engaging and operating the rock-shaft, and means for rotating the counter-shaft independent of the axle.

4. In a seed-planter, the combination with a main frame, supporting-wheels, and axle, of a counter-shaft, a wheel rotatable upon said counter-shaft and carrying a clutch member, a belt passing over said wheel and the axle, a clutch member splined upon the counter-shaft and normally held in engagement with the other clutch member, a belt driven by said counter-shaft, dropping mechanism, means carried by said belt for intermittently operating the dropping mechanism, a hand-shaft, and a driving connection between said hand-shaft and counter-shaft, substantially as and for the purpose set forth.

5. In a seed-planter, the combination with a dropping mechanism, of a wheel rolling on the ground, driving connections between said wheel and dropping mechanism, means for disconnecting said connections between the wheel and dropping mechanism, and means for advancing said connections independent of the wheel but without disconnecting the driving connections.

TIMOTHY J. GAYNOR.

Witnesses:
ARTHUR M. HOOD,
FRANK A. FAHLE.